N. BARLOW.
SAW.
No. 12,664.
Patented Apr. 10, 1855.
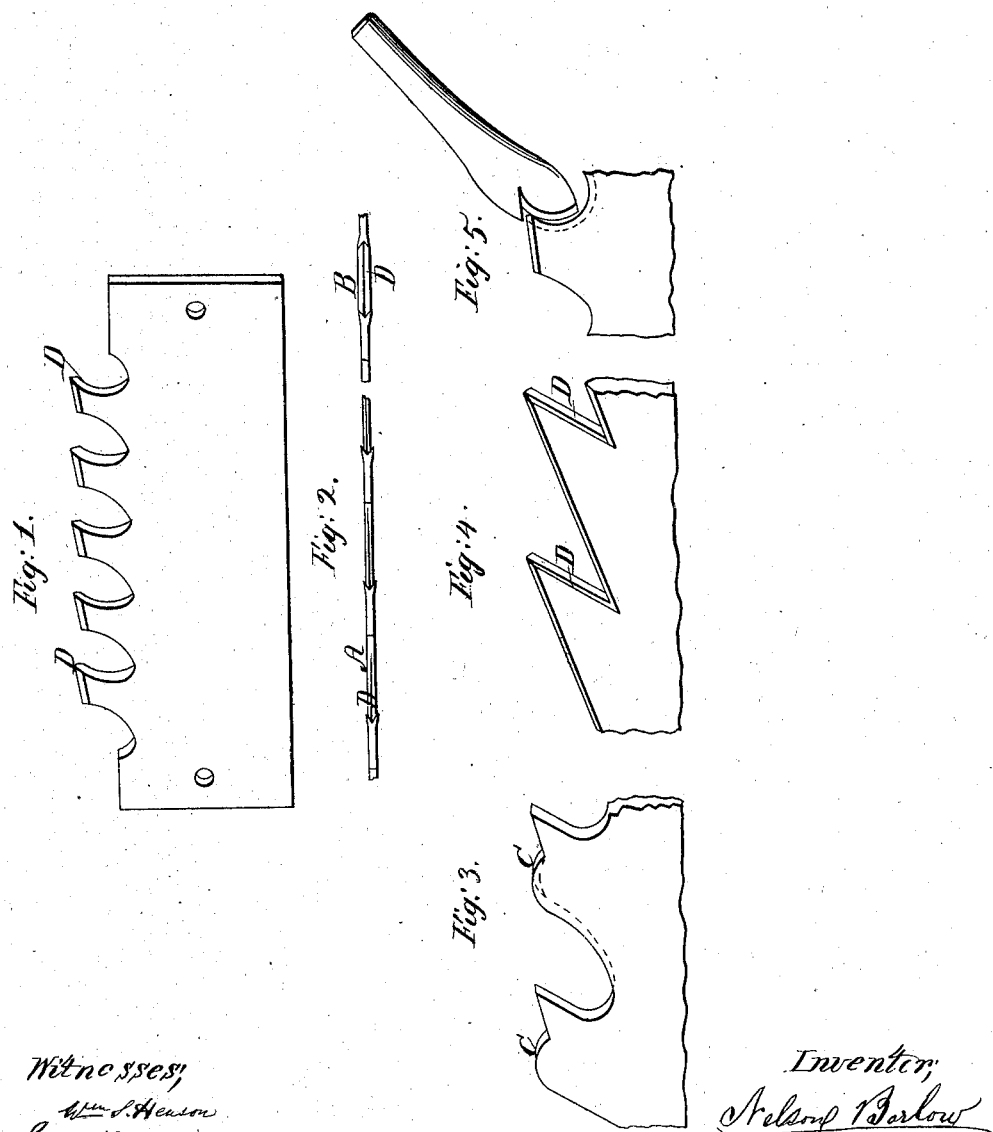

UNITED STATES PATENT OFFICE.

NELSON BARLOW, OF NEWARK, NEW JERSEY.

SAW-TOOTH.

Specification of Letters Patent No. 12,664, dated April 10, 1855.

*To all whom it may concern:*

Be it known that I, NELSON BARLOW, of the city of Newark, county of Essex, and State of New Jersey, have invented a new and useful Improvement in Saws and Saw-Teeth; and I do hereby declare the following to be a full and exact description thereof, reference being had to the accompanying drawings, forming part hereof.

This invention relates to improved cutting edges formed opposite each other upon the sides of saw teeth by means of a grooved recess or space between said sides; and to beveling or rounding the back of the teeth in a form corresponding to said recess.

Figure 1 in the drawings represents a series of teeth so constructed. Fig. 2 is a section of the same. Figs. 3 and 4 are modifications of this improvement and Fig. 5 exhibits a method of "setting" the teeth by means of a punch which (with light blows) spreads their edges apart sufficiently to give the requisite clearance.

A recess is formed on the front angle of the tooth extending inward as far as the roots of the teeth if desirable, and parallel with the side of the saw, the shape of which being concave or angular, gives acute edges upon the sides of the teeth to give the best effect to which improvement, the back angles of the teeth are rounded in a form corresponding with the other, thereby enlarging the cutting surface of the points and rendering each tooth so formed, a perfect cutter on the different angles presented to the wood. The spaces are formed by means of a steel burring tool with its outer edge of suitable shape to give the requisite form to the recesses and edges. The burrs can be used in a convenient machine, or a tool can be adapted by which the same can be done by hand, or where the improvement is embodied in teeth, having the usual angular form (as Fig. 4) a reciprocating cutter may be used instead of the burring tool. Suitable "swages" adapted to the different angles of the teeth may also be used for this purpose of for "setting" after they are thus formed.

The teeth may be "set" alternately in the usual way but the method before mentioned is preferred. The sides of the teeth may be made even and sharpened by passing a file or stone over their surfaces.

It is not deemed necessary to more fully describe the process or tools for milling and setting as their construction and use will be well understood by any mechanic.

In the drawings (Figs. 1, 2 and 4) the side cutting edges are shown extending back to the bottom of the teeth forming thereby when so used planing cutters that act upon and smooth the sides of the material. An important advantage results from this; the portion of wood removed is retained between said cutting edges and carried forward; the tendency being to draw inward from the cutters, while with old well known methods the grain of the wood is broken asunder and forced to some extent outward.

Where teeth are shaped with circular spaces between them as at Figs. 1 and 2 such edges may be formed upon the root and back angle of the teeth. This is especially adapted to reciprocating saws; or they may be formed as shown in Fig. 3, where C, represents pairs of cutters alternated with teeth of the usual shape.

In the saws in common use for splitting lumber the front angles of the teeth are filed square with their sides. It is obvious that such teeth are cutters only with reference to one of their three acting angles (the point) while the others, not being so adapted, act with a rasping effect, breaking the fibers of the wood. The loosened fibers become obstructions that deflect and force the saw from its correct line. Especially in wet or cross grained material are such defects noticeable.

In the improvement in question not only is that which is cut by each tooth retained in the recessed space between the side projections while passing through the material, but as by this means the wood is cut smoothly upon its sides, no obstruction of the kind referred to can occur to cause deflection or unevenness. It will be apparent that work can by this means be done with greater perfection than in the usual way as, while the teeth with their rounded points present an improved form of cutter for sawing, their sides are constituted a series of cutters adapted for planing, and as the action is confined to cutting (tearing and pinching being avoided) the saws can be operated with much less power than those of the common kind, and will retain their cutting edge a longer time.

Saws having a cutting edge upon one side of each tooth, beveled alternately inward, have been long in use. These are not adapted for splitting nor cutting edges arranged in this manner for planing or smoothing lumber, for the reason that the portion cut passes obliquely back and becomes wedged between the inner angle of the cutter and the wood, thus causing obstructions and the teeth or cutters to lead off and cut a wider kerf than is due to the thickness of the saw.

In the present plan the chief advantage is due to the fact that the cutters are placed in opposite positions, thereby balancing and controlling the action of each other, while should the teeth, from imperfection or other cause, only cut upon one of their sides the passage of obstructions along the sides of the teeth is prevented by means of the grooved recess and chips are still retained and carried forward as when the cutter are acting upon both sides.

Other modifications of these cutters may be used by the formation of the same (in pairs) upon alternate teeth or openings may be made through the saw having their edges armed with cutters of the form described.

Having thus fully described my improvements in saws, what I claim therein as new and desire to secure by Letters Patent is,—

The within described improvements consisting of the recessed space (D) and combined cutters upon the sides of saw teeth, and also the rounded form given to the outer points of the teeth when arranged, formed and operating substantially as herein described.

NELSON BARLOW. [L. S.]

Witnesses:
 WM. S. HENSON,
 GEO. NUTTMAN.